(12) United States Patent
Ha et al.

(10) Patent No.: US 9,036,007 B2
(45) Date of Patent: May 19, 2015

(54) SYSTEM AND METHOD FOR CONVERTING TWO DIMENSIONAL TO THREE DIMENSIONAL VIDEO

(75) Inventors: Hyeong-Seok Victor Ha, North York (CA); Jason Chui-Hsun Yang, Toronto (CA)

(73) Assignee: Broadcom Corporation, Irvine, CA (US)

( * ) Notice: Subject to any disclaimer, the term of this patent is extended or adjusted under 35 U.S.C. 154(b) by 579 days.

(21) Appl. No.: 13/277,852

(22) Filed: Oct. 20, 2011

(65) Prior Publication Data

US 2013/0070050 A1 Mar. 21, 2013

Related U.S. Application Data

(63) Continuation of application No. 13/233,341, filed on Sep. 15, 2011, now abandoned.

(51) Int. Cl.
*H04N 5/14* (2006.01)
*H04N 13/02* (2006.01)

(52) U.S. Cl.
CPC .............. *H04N 5/144* (2013.01); *H04N 13/026* (2013.01); *H04N 13/0264* (2013.01); *H04N 13/0271* (2013.01)

(58) Field of Classification Search
CPC ....................................................... H04N 5/144
USPC ................ 348/43, 46; 382/154; 345/419, 427
See application file for complete search history.

(56) References Cited

U.S. PATENT DOCUMENTS

2011/0032329 A1* 2/2011 Bauza et al. .................... 348/43
2012/0268562 A1* 10/2012 Wang .............................. 348/44

* cited by examiner

*Primary Examiner* — Dave Czekaj
*Assistant Examiner* — Berteau Joisil
(74) *Attorney, Agent, or Firm* — Brinks Gilson & Lione

(57) ABSTRACT

A system and method for converting two dimensional video to three dimensional video includes a processor having an input for receiving a two dimensional image data and an output for outputting three dimensional image data to a display. The processor is configured to receive two dimensional image data, segment a specific object in the two dimensional image data based on variations in brightness and sharpness in the two dimensional image data to identify and locate the specific object in the two dimensional image data. The processor is also configured to adjust the depth value of the specific object over the period of time as the size of the specific object changes in each of the two dimensional images or adjust the depth value of the specific object over the period of time as the size of the specific object changes in each of the two dimensional images.

20 Claims, 7 Drawing Sheets

(a) Row-accumulated Depth (b) Column-accumulated Depth (C) Baseline Depth Map

SYSTEM AND METHOD FOR CONVERTING TWO DIMENSIONAL TO THREE DIMENSIONAL VIDEO

CROSS REFERENCE TO RELATED APPLICATION

This application is a continuation of U.S. application Ser. No. 13/233,341, filed Sep. 15, 2011, the entire contents of which are herein incorporated by reference.

TECHNICAL FIELD

This disclosure relates to systems and methods for converting two dimensional video to three dimensional video.

BACKGROUND

In two dimensional to three dimensional video conversion, depth information is extracted from input pictures of the two dimensional video in order to generate a pair of stereo output pictures. Extracting depth information is a key step in the two dimensional to three dimensional conversion process.

Preconstructed three dimensional video, such as the video displayed at properly equipped movie theaters, considers the three dimensional aspects of the video from the start. Essentially, three dimensional processing technicians can properly isolate objects in a scene and place these objects in a depth map along the z-axis. Because these are preconstructed videos, the technicians have the benefit of knowing when objects will enter into the video both before and after the present image of the video. This knowledge allows these technicians to properly place these objects in the depth map.

However, in many instances, converting two dimensional video to three dimensional video, such as converting broadcast video into three dimensional video, is much more difficult, particularly when it is done in real time. Unlike preconstructed three dimensional movies, there are no technicians that have preprocessed the video with the knowledge of which objects will enter the scene or leave the scene. Accordingly, it is very difficult to properly identify objects and place these objects in a depth map.

BRIEF DESCRIPTION OF THE DRAWINGS

The system may be better understood with reference to the following drawings and description.

DETAILED DESCRIPTION

Figure 1:
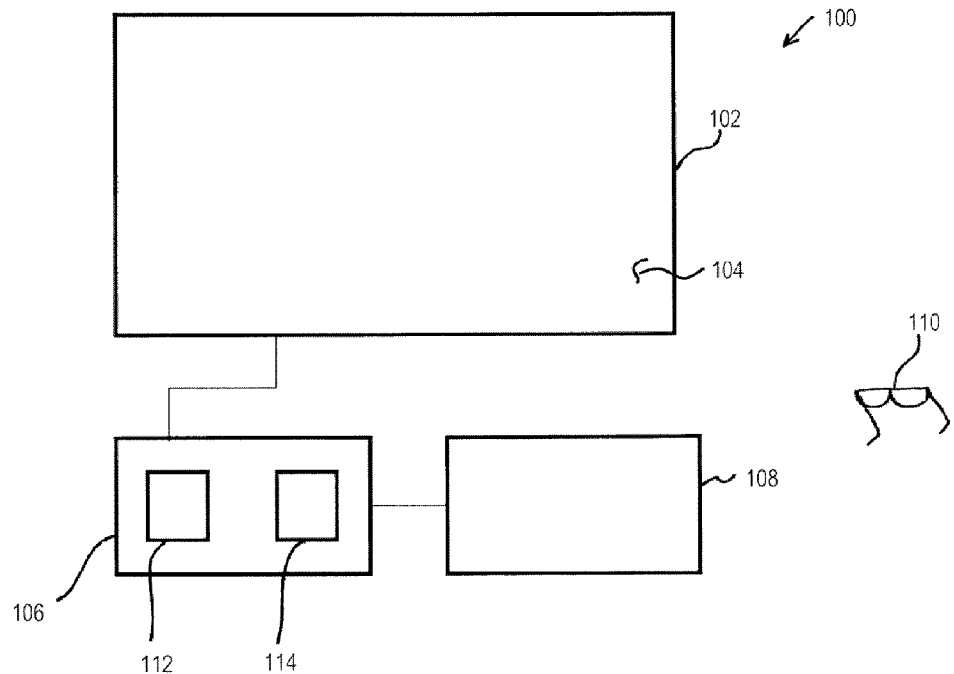
FIG. 1 illustrates a system for converting two dimensional video to three dimensional video.

Referring to FIG. 1, a system 100 for determining the location of images in a depth map is shown. The system 100 includes a three dimensional display 102 having a viewing area 104, a processor 106 in communication with the three dimensional display 102 and a storage device 108. As one example, the three dimensional display 102 can be a polarized three dimensional display. A polarized three dimensional display is configured to project two images superimposed on the display area 104 of the three dimensional display 102 at the same time. Generally, two images are projected superimposed on to the display area 104 of the three dimensional display 102 through orthogonal polarizing filters. For example, pixels forming a left view image can be linearly polarized at 45 degrees and pixels forming a right view image can be linearly polarized at 135 degrees. In order for a view to see the left view image with their left eye and the right view image with their right eye, the viewer can wear a pair of passive glasses 110 with the left lens polarized in the same way as the left view image pixels on the display 102 and the right lens being polarized in the same way as the right view image pixels on the display 102. By so doing, the viewer can see both simultaneously, with the left eye seeing the left view image and the right eye seeing the right view image.

The processor 106 can include an instruction set 112 having instructions that are executed by an execution unit 114 of the processor 106. It should be understood that the processor 106 can be a single processor or can be multiple processors located within the same package or can be multiple processors that are in communication with each other and distributed on one or more circuit boards.

Alternatively, the instruction set 112 can be stored in the memory device 108, and can be read and executed by the processor 106 from the memory device 108. The memory device 108 can be any suitable memory device capable of storing digital information. For example, the memory device 108 can be a solid state memory device, a magnetic memory device, such as a hard disk, or an optical memory device. Further, the memory device 108 can be incorporated into the processor 16 or can be located separately from the processor 106. Further, the memory device 108 can be in direct physical and electrical communication with the processor 106, but can be also remote from the processor 16 and can communicate with the processor 106 through a wired or wireless communications network.

Figure 2:
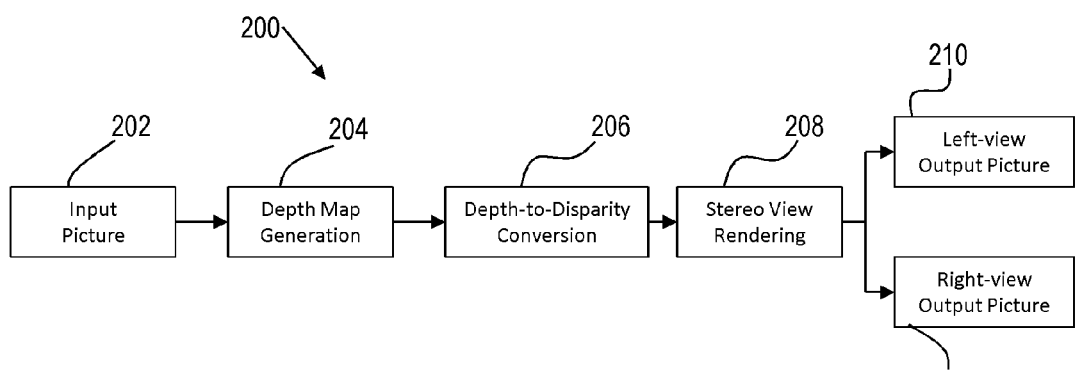
FIG. 2 illustrates logic flow for a method for converting two dimensional images to three dimensional images.

FIG. 2 shows logic for converting two dimensional images to three dimensional images. Each of the modules or functional steps can be implemented, for example, as instructions executed by the processor 106 of FIG. 1, in hardware only, or as a combination of hardware and software.

A two dimensional input picture 202 can be provided to a depth map generation module 204. The input picture 202 can be a two dimensional image, such as a frame of video of any resolution (e.g., output from a DVD or Blu-Ray™ player), or can be any other type of two dimensional image. The depth map generation module 204 extracts depth information in the spatial domain. As examples, the depth map generation module 204 can analyze two dimensional image information including, for example, luma, chroma, and edge information to estimate the depth level for certain regions or objects in the two dimensional images.

The depth map can be then provided from the depth map generation module 204 to a depth to disparity conversion module 206. The depth to disparity conversion module 206 calculates a distance that a particular pixel will need to be shifted in a left view output picture and/or the amount that a particular pixel will need to be shifted in a right view of the picture for a viewer to perceive the intended depth level in a stereo view. The depth to disparity conversion module 206 determines the shifts for any desired pixels in the image and builds a disparity map that identifies the shift applicable to each pixel. The depth to disparity conversion module 206 provides the disparity map to the stereo view rendering module 208.

The stereo view rendering module 208 renders the three dimensional image. To that end, the stereo view rendering module 208 generates the left view picture 210 and the right view picture 212 with the appropriate pixel shift values applied so that the viewer can perceive each pixel at the appropriate depth level. Accordingly, the stereo view rendering module 38 can provide a left view output picture 210 and a right view output picture 212 to the display area 104 of a display 102 of FIG. 1.

Figure 3:
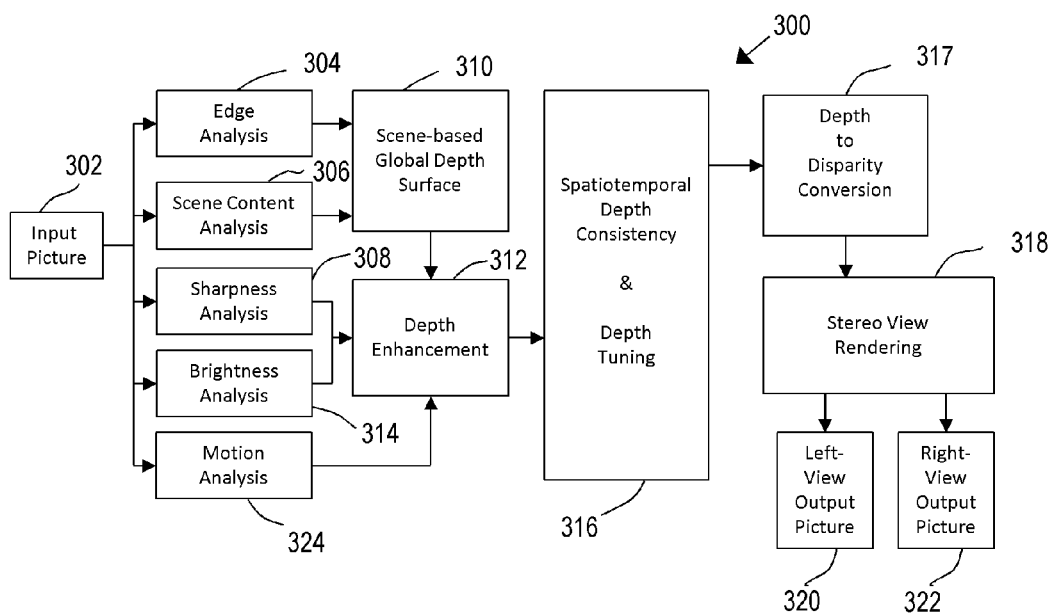
FIG. 3 illustrates the system of FIG. 2 for converting two dimensional images to three dimensional images in greater detail.

FIG. 3 shows a more detailed example of a system 300 for generating a three dimensional image based on a two dimensional input picture. The input picture 302 can be provided to a variety of different image processing modules. Examples of the image processing modules include an edge analysis module 304, a scene content analysis module 306, a sharpness analysis module 308, and a brightness analysis module 310. Additional, fewer, or different modules can be present to preprocess the two dimensional input picture.

There are many different methods for edge detection that the edge analysis module 304 can implement. Examples include zero crossing based edge detection and search base edge detection. Zero crossing based edge detection methods can identify zero crossings in a second order derivative expression from the image in order to determine the location of the edges. These may be zero crossing points, for example, the luma values or the zero crossings of an expression, which may be the zero-crossings of the Laplacian or the zero-crossings of a non-linear differential expression. Prior to applying zero crossing based edge detection methods, a pre-processing step of smoothing may be applied to a possible edge. In search based methods, edges may be detected by computing an edge strength using a first order derivative expression such as gradient magnitude expression. Then local directional maxima of the gradient magnitude may be identified by computing an estimate of the local orientation of the edge. The edges may then be segmented and/or categorized and labeled. The edge detection results may be provided from the edge analysis module 304 to a scene based global depth surface module 310.

In addition, the input picture 302 can be provided to a scene content analysis module 306. The scene content analysis module 306 can analyze changes in the scene, for example, the changing of camera perspective including zoom, pan, and tilt as well as the change of various objects or regions within the scene. For example, objects can be identified in the video scene by image processing techniques including adaptive background subtraction or other techniques. The scene content analysis data from the scene content analysis module 306 can be provided to the scene based global depth surface module 310.

In addition, the input picture 302 can be provided to a sharpness analysis module 308. The sharpness analysis module 308 can analyze the sharpness of certain regions within the image to determine an approximate depth of that region of the image. The lack of depth and/or gradient of a particular region would correspond to a depth of a particular region in the image relative to the focal point of the optical system providing the image to the camera.

More specifically, the sharpness analysis module 308 receives the input picture 302 and segments objects in the input picture 302 based on variations in sharpness in the input picture 302 to identify and locate specific objects in the input picture 302. Once these objects are segmented and identified, the sharpness analysis module 308 determines a depth value in the depth map for the objects based on the sharpness of the object. For example, objects that are determined to be sharper can be given a lower value in the depth map, thereby placing the object closer as perceived by the viewer. Additionally, the opposite can be true as well, when the object is placed further away from the viewer and therefore given a greater value in the depth map. Additionally, the object could be placed in the middle of the depth map. Further, if multiple objects are identified and each of these objects have similar sharpness, these objects can be given the same depth value. In this way, the system 300 can control the fluctuation of depth values within the region and for objects with similar sharpness. The system 300 can implement any desired mapping between sharpness values and depth.

The results of the sharpness analysis module 308 can then be provided to a depth adjustment module 312. In addition, the results of the sharpness analysis module 308 can also be provided to the scene content analysis module 306. The scene content analysis module 306 can adjust the scene content analysis based on the sharpness analysis data.

The input picture 302 can also be provided to a brightness analysis module 314. The brightness analysis module 314 can analyze the input picture 302 to identify and segment various objects or regions within the image based on brightness characteristics of the image. The brightness analysis module 314 can provide brightness data to the depth adjustment module 312.

The scene based global depth surface module 310 accepts the edge detection data from the edge analysis module 304 and the scene content data from the scene content analysis module 306. The scene based global depth surface module 310 generates a global depth surface model that identifies the various regions within the image based on one or more surface segments. Each surface segment can have a given depth contour calculated based on the edge detection information and the scene content data. The global depth surface model from the scene based global depth surface module 310 can be provided to the depth enhancement module 312.

As stated above, the global depth surface module can be used in conjunction with the sharpness data and the brightness data to adjust the depth of certain regions within the input picture. These regions can be placed into particular depth layers, where each depth layer, as described above, can have a layer identification, a layer depth origin, and a layer depth volume. Accordingly, particular regions and/or objects can be tracked across multiple images while providing efficient use of the available depth range. The depth enhancement module 312 can provide depth adjustment information including layer configuration information such as a number of layers and the volume of each layer to a spatial temporal depth consistency and depth tuning module 316.

The spatial temporal depth consistency and depth tuning module 316 can generate a depth map based on the depth adjustment information as well as the pixel information provided from the input picture. The spatial temporal depth consistency and depth tuning module 316 can provide a depth map to a stereo view rendering module 318. For example, after the depth map is created, it becomes available for final adjustment of depth values according to user-specified settings. This allows gain around a programmable pivot point as well as ability to shift the global depth. The shift can be characterized by the equation y=A*(x−p)+B, where x is the current depth value, A is a gain factor, p is a pivot point, B is an offset/shift, and y is the output depth value.

A disparity map can be generated from the depth-to-disparity conversion module 317. A stereo view rendering module can utilize the disparity map to generate a left view output picture 320 and right view output picture 322 that can be provided to a three dimensional display 102 to present a three dimensional image to a viewer. Still referring to FIG. 3, the system 300 can include a motion analysis module 324 that receives an input picture and outputs motion data to the depth adjustment module 312.

Figure 4:
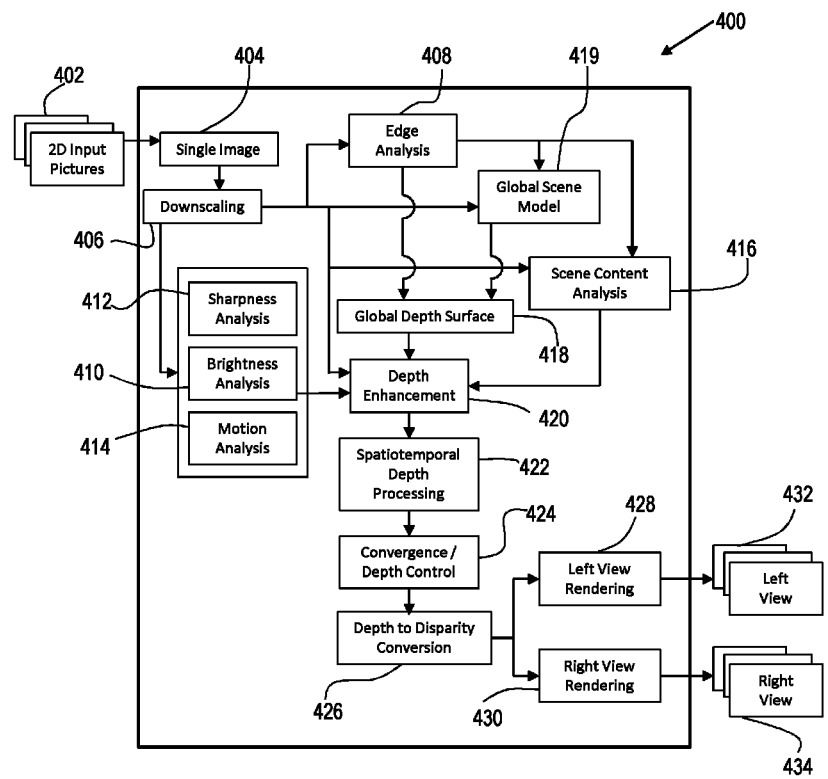
FIG. 4 illustrates a system of FIG. 3 for converting two dimensional images to three dimensional images in greater detail.

FIG. 4 is another more detailed example of a system 400 for converting two dimensional images to three dimensional images. Moreover, FIG. 4 is a more detailed example of the system 300 of FIG. 3. In FIG. 4, the system 400 receives two dimensional pictures 402. These two dimensional pictures 402 can be separated into single images 404. Each individual image 404 can be provided to a downscaling module 406, where decimation (or downsampling) occurs. The advantages of decimating the input image 404 are: (1) cost of all signal processing operations is reduced significantly in terms of logic size, bandwidth, memory size, etc.; (2) the algorithm is more robust to noise (random analog and digital compression noise); and (3) allow very smooth depth surfaces to be generated easily by maintaining only the dominant features in the input images.

An edge analysis module 408 can receive data from the downscaling module 406. Edges are widely used spatial features in image processing. The following steps can be executed by the edge analysis module 408 to generate edges that are suitable for two dimensional to three dimensional conversion: (1) compute horizontal and vertical edges; (2) take the larger of horizontal and vertical edges; (3) find maximum edge magnitude in a spatial neighborhood of (2N+1)-by-(2M+1) kernel; (4) suppress edges due to noise, letterbox, and pillarbox; and (5) normalize the edge values to occupy the full x-bit range.

In step 1, horizontal and vertical edges are computed separately. In step 2, the maximum of the horizontal edge, Hedge, and vertical edge, Vedge, is computed as:

edge=MAX(Hedge,Vedge).

In step 3, each edge value, $edge_{x,y}$ located in a pixel coordinates (x,y), is replaced by the maximum edge magnitude in its (2N+1)-by-(2M+1) neighboring kernel.

edge=MAX($edge_{x+i,y+j}$); where i=[−N,+N] and j=[−M,+M]

In step 4, the magnitudes of the edges created by noise, letterbox, or pillarbox are reduced to zero. In step 5, the minimum and maximum edge values of the entire edge map are identified. All of the edge values are multiplied by a suitable scaling factor such that the edge values take up the entire X-bit range where X is the number of bits dedicated to edges in the design. For example, if X=8, the full range is [0, 255]. If the minimum edge value is 3 and the maximum edge value is 180 in the current edge map, a scaling factor of 1.41 is multiplied to all edge values such that the resulting edge values range [4, 253].

A brightness analysis module 410 can receive data from the downscaling module 406. Brightness information can be used as object/region segmentation cues. Brightness information does not necessarily provide depth information, but it does provide natural segmentation of the objects/regions in the input picture, especially in decimated pictures. The idea is to codify this brightness information in such a way that depth values are adjusted accordingly based on the brightness of the region. That is, when brightness (or luma) values are similar in the local region, the depth values are not allowed to change much in that region. Therefore, when a single object/region has a uniform brightness (or luma) level, the method ensures depth values to stay uniform in the uniform brightness region. As an example, this method can be used to limit the maximum range of depth value fluctuation of the given local region based on the brightness (or luma) value fluctuation of the same region.

A sharpness analysis module 412 can receive data from the downscaling module 406. There are other cases when a single object/region consists of different brightness (or luma) levels. The depth values assigned to such objects/regions should also remain uniform. The goal is to measure sharpness/blurriness and use it as an indicator of which portion of the input picture is in focus. As the camera lens focus is a function of the distance from the camera to the object/region in focus, all pixels sharing similar levels of sharpness/blurriness belong to the similar depth values (i.e., distance from the camera). When pixels belonging to very different brightness values are nearby in a local region, then the sharpness/blurriness of these pixels are measured. If the sharpness/blurriness measurements are very similar, then all of these pixels receive similar depth values. In this way, no significant fluctuation of depth values is allowed within the region with similar brightness and sharpness.

A motion analysis module 414 can receive data from the downscaling module 406. In practice, motion present in the input image sequence may not be a perfect translational motion of rigid bodies. Many of motion types detected in natural scenes are complex and non-rigid. In order to create pleasing three dimensional effects, such complex and non-rigid motion types have to be first detected and identified in a robust manner. One advantage in two dimensional to three dimensional conversion is that the motion information needs not be very accurate or precise. Some other applications such as compression, noise reduction, de-interlacing, or frame-rate conversion require pixel-level or sub-pixel-level precision of the motion information. It is not necessarily the case for the two dimensional to three dimensional conversion problem. Therefore, motion detection techniques that are more robust to different motion types are preferred over highly precise and accurate techniques that are not robust to different motion types. Successful motion detection for two dimensional to three dimensional conversion may incorporate the motion detection techniques that perform well on natural scenes with complex non-rigid motion types.

A scene content analysis module 414 can receive data from the downscaling module 406 and the edge analysis module 408. For example, assume there is a scene that includes a sky with clouds. In the scene content analysis performed by the scene content analysis module 414, the sky and clouds are detected. The presence of the sky and clouds is a very useful depth cue because they are farther from the viewer than other objects in most cases. The three processing steps are: (1) locate major horizontal edges or lines that represent the horizon; (2) analyze color content—detect spatial concentration of blue and white colors in upper region of the image; (3) identify the sky and clouds based on the horizon and color contents; and adjust depth values of the sky region such that they are farther than other objects in the image.

In step 1, major horizontal edges are detected. In one embodiment, the number of edges with magnitudes larger than a threshold is counted in the N-by-M neighborhood. If the number exceeds another predetermined threshold, the center location of the N-by-M neighborhood is detected as part of major horizontal edge. For each row of the image, the number of major horizontal edge is counted. The row with the highest number of major horizontal edges is declared as the horizon.

In step 2, the number of blue and white colored pixels is counted for each row of the image. In step 3, the information from step 1 and 2 is used to identify the sky region. In one embodiment, if the concentration level of the blue and white colored pixels is larger than a predetermined threshold above the horizon detected in step 1, then the region above the horizon is identified as the sky region. In step 4, the depth values of the sky region are adjusted such that the sky and the clouds are farther away from the viewer compared to other objects/regions in the image.

A global scene model 419 module can receive data from the downscaling module 406 and the edge analysis module 408. The global scene model 419 approximates the depth surface of the scene in the input picture. For example, the 'Top-to-Bottom' model approximates the depth surface of a scene where top portion is far away from the viewer (behind the screen) and bottom portion is closer to the viewer (in front of the screen). The scene in the input picture is analyzed and one of the available global depth models is selected. Then, a baseline depth map is constructed based on the model and edge information.

A global depth surface module 418 can receive data from the edge analysis module 408 and the global scene model 419. A depth map can be generated by the global depth surface module 418 and a depth enhancement module 420. The depth enhancement module 420 can receive data from the downscaling module 406 and at least one of the sharpness analysis module 412, brightness analysis module 410, and the motion analysis module 414. The global depth surface module 418 generates the global depth surface given a suitable global depth model for the input image. The depth enhancement module 420 modifies the global depth surface to maximize the amount of local depth variation and as a result enhance depth perception.

Figures 5A, 5B:
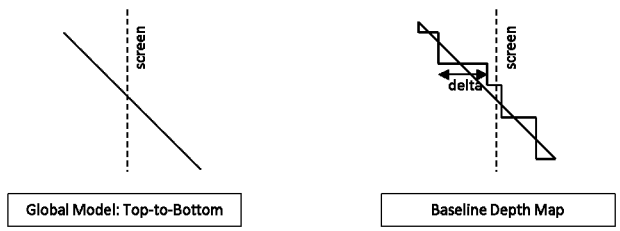
FIGS. 5A and 5B illustrate side views of depth maps.

With regards to the global depth surface module 418, use of global geometric depth models can be used in two dimensional to three dimensional conversion. Each global depth model provides a pattern of depth gradient suitable for a given scene. For example, as shown in FIG. 5A, a top-to-bottom model provides a depth surface pattern that gradually increases from the top of the image toward the bottom such that the top portion is far away and the bottom portion is closer to the viewer. Assuming a global depth model is given, a global depth surface is generated based on the edges extracted from the input image. As a first step, two baseline depth surfaces, row-accumulated and column-accumulated depth surfaces, are generated and combined into one baseline depth map. As a second step, the baseline depth map from step 1 is combined with edges to generate the final global depth surface As explained in the previous paragraphs, a baseline depth map is generated in the following manner. First, a row-accumulated depth map is created based on the edges in the edge map. The depth values in the row-accumulated depth map increase monotonically from the top to the bottom of the depth map. The amount of increase from row-to-row is measured in the variable delta shown in FIG. 5B.

The value of delta between the $i^{th}$ row and $(i+1)^{th}$ row is computed as the absolute difference between the maximum edge value in the $i^{th}$ row and maximum edge value in the $(i+1)^{th}$ row.

$$\text{delta}=\text{abs}(\text{max\_edge}_{(i)}-\text{max\_edge}_{(i+1)})$$

The final row-accumulated depth map becomes the baseline depth map for the top-to-bottom global model. For the center convex model in which the isotropic center region of the picture is closest to the viewer, the depth values start decreasing at the mid-point of the map towards the bottom of the map. For the vertical concave model in which the horizontal band of rows in the middle of the picture is farthest away from the viewer, the row-accumulated depth map of the center convex model is inverted so that the largest depth values are located at the top and bottom of the map.

The column-accumulated depth map is created in a very similar manner except that the delta between two successive columns (instead of rows) is computed.

Figures 6A, 6B, 6C, 7A, 7B:
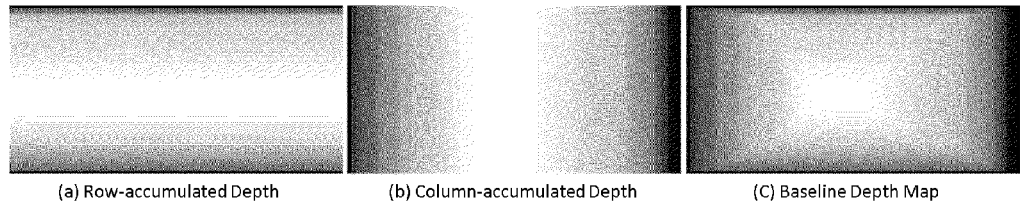
FIGS. 6A, 6B, and 6C illustrate a row accumulated depth map, column accumulated depth map, and a baseline depth map, respectively.
FIGS. 7A and 7B illustrate a spatial neighborhood in a global depth surface.

The row- and column-accumulated depth maps are merged together by taking the smaller of the two values to generate the baseline depth map. Examples of this are shown in FIGS. 6A, 6B, and 6C. The two depth maps can also be merged by taking maximum or average of the two corresponding values.

The baseline depth map is blended with the edge map. The blending factors are programmable parameters. Blending of the edges with baseline depth values is performed to increase relative depth perception because the edges increase the depth variation at object boundaries of the input image. The edge values are clamped prior to blending to achieve the effect of depth layer segmentation.

Referring back to FIG. 4, the depth enhancement module 420 can perform addition modifications. A spatial neighborhood in the global depth surface is examined to find a depth value that can replace the current depth value. The corresponding luma values in the same spatial neighborhood are examined for this purpose. When the absolute difference between the luma values of the current pixel and a neighboring pixel is less than a predetermined threshold, the current depth value is modified by taking minimum (or average, maximum, median, etc.) of the current depth value and the neighboring depth value. Referring to FIG. 7A, a 2D neighborhood of size 5×5 is used for this purpose where $z0$ indicates the current depth value. The depth values in the triangular neighborhood, $z1$~$z16$, are examined. In another embodiment shown in FIG. 7B, depth values in a diamond-shaped neighborhood, $z1$~$z16$, are examined.

A spatiotemporal depth processing module 422 can receive data from the depth enhancement module 420. The spatiotemporal depth processing module 422 provides additional filtering. More specifically, the depth map goes through spatial and temporal filtering to ensure smooth variation of depth values in time and space, and to avoid blurring the depth values across sharp edges that separate objects and regions.

During spatial filtering, certain depth values in the neighborhood are excluded from spatial filtering. When depth changes sharply, at an object boundary for example, applying spatial filtering at this location may cause geometric distortion such as bending or warping of the object contours. If the absolute difference between the current depth value and a neighboring depth value is larger than a threshold, then the neighboring depth value is excluded from the spatial average filtering. The threshold value is adaptive and changes depending on where the current depth value is located in the depth map.

Temporal filtering reduces temporal flickering of depth values in video and ensures quick updates of depth values using FIR temporal filtering after scene change. The depth values computed from the current input picture are blended with the depth values computed from the previous input picture. Let the depth map of the current picture to be denoted as D(t) and the depth map of the previous picture as D(t−1). Then, blending of the two depth maps is simply:

$$D'(t) = ALPHA \cdot D(t) + (1-ALPHA) \cdot D(t-1); \text{ where } ALPHA = 0 \sim 1.$$

The blending factor ALPHA may be programmable.

A convergence control/depth control module 424 receives data from the spatiotemporal depth processing module 422. The convergence control/depth control module 424 may provide a global shift of the depth values based on a programmable amount. After the depth map is created and upsampled to full native resolution, it becomes available for final adjustment of depth values according to user-specified settings. It allows gain around a programmable pivot point (depth control) as well as ability to shift the global depth uniformly (convergence control). See the equation below:

$$y = A*(x-p) + B$$

where x is the current depth value, A is a gain factor, p is a pivot point, B is an offset/shift, and y is the output depth value.

There is also programmable clamping of minimum and maximum of the output depth value y. These variables are fully controlled through programmable registers A depth to disparity conversion module 426 can receive data from the convergence control/depth control module 424. Disparity is the difference between the locations of stereo pixel pair in the left- and right-view images measured in number of pixels. When disparity is measured directly on the display screen in millimeters, it is called parallax. Conversion from depth values to disparity (or parallax) values is performed: Input is a depth map containing depth values. Output is a disparity map containing disparity values. Depth to disparity conversion is done for every depth value in the depth map such that the size of the output disparity map is equal to the size of the input depth map. An efficient and flexible conversion method from depth to disparity values is possible using a k-point LUT (look up table). Each entry of the LUT is programmable and the data points between two LUT entries are linearly or non-linearly interpolated.

After the depth to disparity conversion module 426 has performed its processing, the stereo rendering can be accomplished. To that end, a left view picture 428 and the right view picture 430 are generated with the appropriate pixel shift values applied so that the viewer can perceive each pixel at the appropriate depth level. A plurality of left view pictures 428 and the right view pictures 430 can then be outputted as left view pictures 432 and right view pictures 434.

Figure 8:
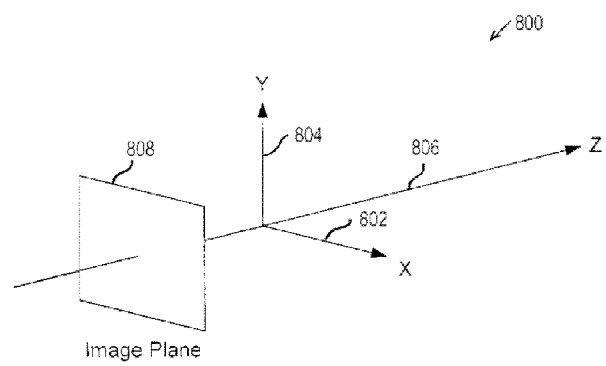
FIG. 8 illustrates a coordinate system in a space relative to an image.

Referring to FIG. 8, a three dimensional coordinate system 800 is shown having an x-axis 802, a y-axis 804, and a z-axis 806. An object 808 from the input picture 302 of FIG. 3 is located in the depth map along the z-axis 806. The motion of the object 808 in space can be decomposed into a number of motion elements including translations along the x-axis 802, y-axis 804, and z-axis 806 as well as rotation about the x-axis 802, y-axis 804, and z-axis 806.

Translational motion across the image 302 can be detected by the motion analysis module 324 along the x-axis 802 and the y-axis 804 of the image 302. This encompasses both global translation motion due to camera panning or local translation motions of objects or regions. Further, occlusion information can be extracted from translational motion on the x-y plane as objects enter or leave the input picture 302 and the depth of each object can be adjusted as objects enter or leave the input picture 302.

Translational motion on the z-axis 806 is a special case for three dimensional rendering because it is directly related to depth changes. Translational motion of individual objects or local regions along the z-axis 806 is also useful for three dimensional rendering because the depth values of these local moving objects change directly proportional to the motion. For example, as the size of the object 808 changes (e.g., increases) in the input picture 802 over a period of time the depth value of the object 808 can be adjusted (e.g., increased) over that period of time. Motion present in the input picture 802 does not need to be a perfect translational motion. For example, most of the motion types detected in natural scenes are complex and non-rigid. In converting a two dimensional image to a three dimensional image, the motion information can be approximate and need not meet any particular level of accuracy or precision. Other processing, such as compression, noise reduction, de-interlacing, or frame rate conversion can require pixel level or subpixel level precision of the motion information, however.

Figure 9:
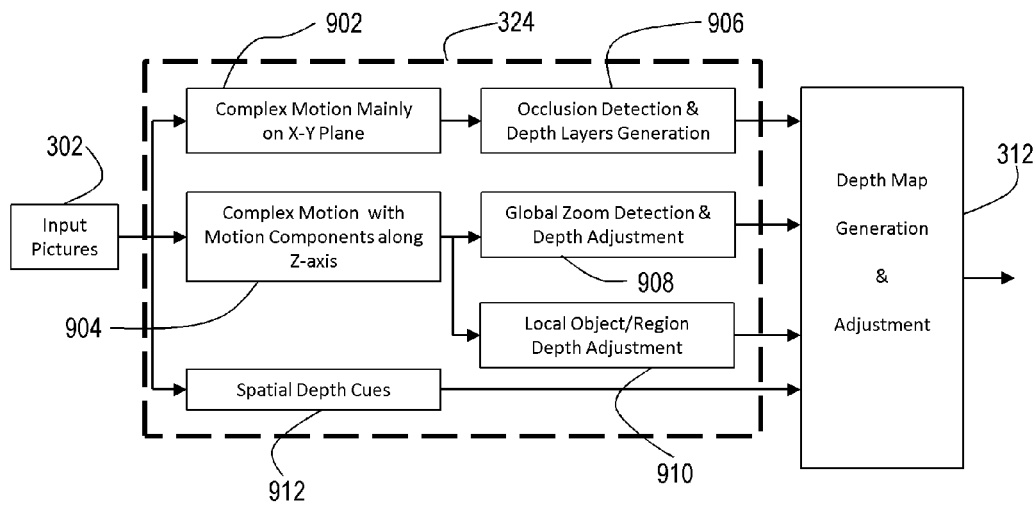
FIG. 9 is logic flow for of the motion analysis module of FIG. 3.

FIG. 9 illustrates a more detailed diagram of the motion analysis module 324. As described above, the motion analysis module 324 receives an input picture 302 and outputs motion analysis data to the depth map adjustment module 312. The motion analysis module 324 includes a complex motion mainly on x-y plane module 902, which is configured to receive the input picture and determine if any objects in the input picture 302 are moving primarily along the x-y plane. This can be determined by first segmenting the objects, as described in the paragraphs above, and then determining if there is movement primarily along the x-y plane of these objects. Detection of complex non-rigid motion is detected with much a relaxed accuracy requirement. The occlusion information is extracted from the motion on X-Y plane such that depth ordering is determined for different regions of the image. Depth ordering means placing certain pixels/regions in front of the others in terms of depth.

The motion analysis module 324 also includes a complex motion with motion components along the z-axis module 906, which is configured to determine if there is a motion along the z-axis of the input pictures of specified objects. This can be determined by first segmenting the objects, as described in the paragraphs above, and then determining if there is a change in size of these objects. Complex motion along Z-axis: (a) Detection of global zoom in/out motion is used for adjusting the global depth levels. The depth is shifted uniformly on the entire scene based on the zoom motion information. (b) Detection of object/region motion along z-axis allows local adjustment of depth for certain pixels/regions in the image.

The motion analysis module 324 can also include an occlusion detector and depth layers generation module 906, which receives data indicating if there is any motion along the x-y plane from module 902. From there, the occlusion detection and depth layers generation module 906 can determine if any new objects have entered into the input picture 302 along the x-y plane and then assign these objects an appropriate depth value that can be based on various different variables, such as brightness of the object or sharpness of the object. In turn, this data can then be provided to the depth map adjustment module 312.

The motion analysis module 324 can also include a global zoom detection and depth adjustment module 908 and a local object/region depth adjustment module 910, both of which receive data from the complex motion with motion components along the z-axis module 904. The global zoom detection and depth adjustment module 88 determines if the movement of objects along the z-axis is global in nature e.g. all the detected objects are increasing or decreasing in size, therefore indicating that all of the objects are moving along the z-axis. For example, the camera capturing the images can be zooming in or zooming out, which has the effect of making all objects in the scene appear either closer or farther away. The global zoom detection and depth adjustment module 908 determines if the zoom function is occurring and adjusts the objects in the depth map accordingly and provides this data to the depth map adjustment module 312.

The local objects/region depth adjustment module 910 adjusts single objects or regions of the input picture 302 based on data from the complex motion with motion components along the z-axis module 904. For example, if there is a determination there is motion on the z-axis of an object, the local object/region depth adjustment module 910 will then adjust the depth of the object and provide this data to the depth map adjustment module 312.

The motion analysis module 324 can also include a spatial depth cues module 912. The spatial depth cues module 912 receives the input picture 302 and determines if there are any spatial depth cues in the input picture 302. Spatial depth cues can include sharpness data of the input picture, regions of the input picture, or specific objects located within the input picture 302.

Figure 10:
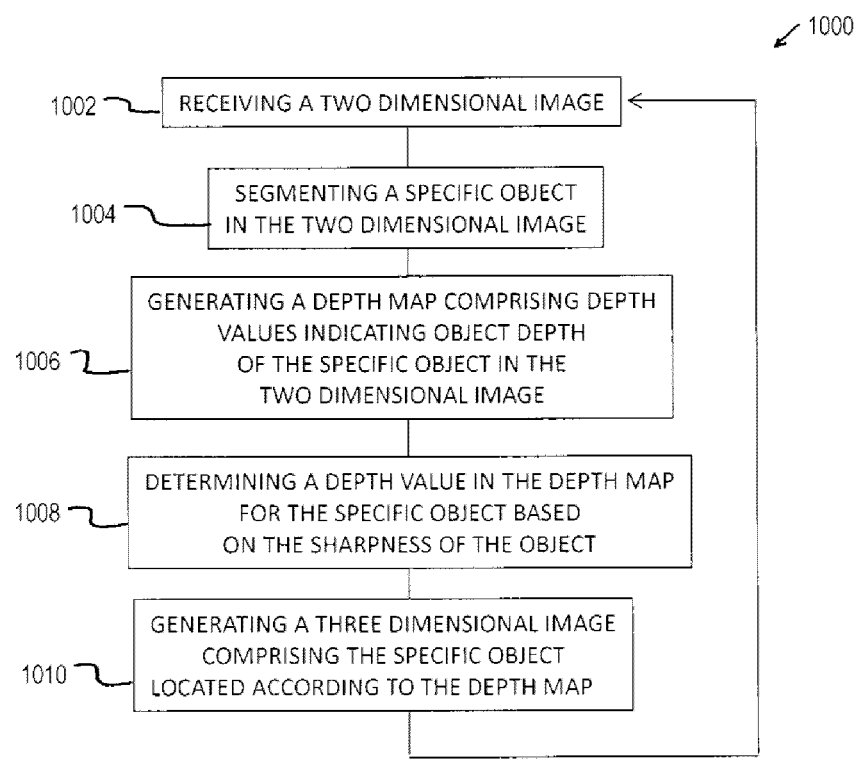
FIG. 10 illustrates a method for converting a two dimensional image to a three dimensional image using sharpness information.

FIG. 10 illustrates logic 1000 for converting a two dimensional image to a three dimensional image using sharpness information. The logic 1000 begins in block 1002 wherein a two dimensional image is received. Next, in block 1004, the two dimensional image is segmented, so as to identify specific objects within the two dimensional image. The segmenting of the two dimensional image can use brightness information found in the two dimensional image to identify objects located within the two dimensional image and then segment these objects in the two dimensional image. For example, in an image containing several objects, the objects in the image can have different colors and therefore have different brightness. Using these different brightness levels, the logic 1000 can then segment and identify these separate objects due to their differences in brightness.

Next, in block 1006, a depth map is generated comprising depth values indicating the depth of the specific object in the two dimensional image. A variety of different depth maps can be used, including those described in the paragraphs above, such as a top-to-bottom model depth map, a vertical concave depth map, a column accumulated depth map, a row accumulated depth map, or a baseline depth map. In block 1008, a determination is made of the depth value for the specific object based on the sharpness of the object. An object that is sharper can be given a lower depth value, indicating that the object is in the foreground. However, any depth value can be assigned to the specific object. Last, in block 1010, a three dimensional image is generated that comprises the specific object located according to the depth map based on the depth value previously assigned to the object in block 1008. The logic 1000 then returns to block 1002 in a continuous fashion.

Figure 11:
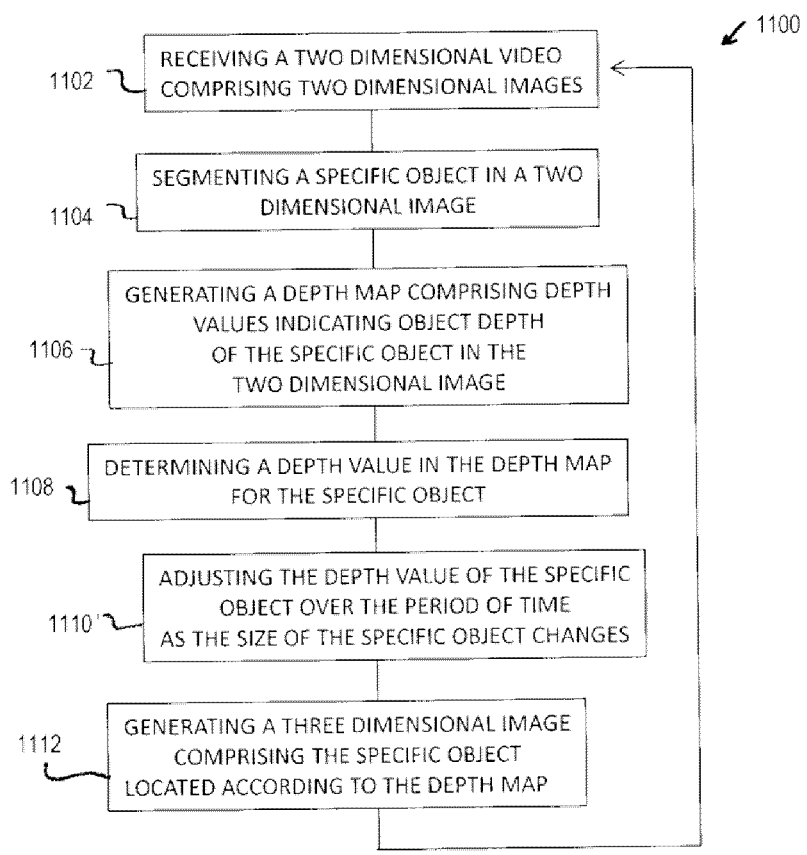
FIG. 11 illustrates a method for adjusting the depth value of a specific object over a period of time as the size of the specific object changes.

FIG. 11 illustrates logic 1100 for adjusting the depth value of a specific object over a period of time as the size of the specific object changes. In block 1102, a two dimensional video is received comprising two dimensional images that are arranged in sequential fashion over a period of time. In block 1104, specific objects in a two dimensional image from the two dimensional video is segmented. Similarly as described in method 1000, specific objects in the two dimensional image can be segmented based on brightness information.

In block 1106, the depth map is generated comprising depth values indicating object depth of the specific objects in the two dimensional image. As described in FIG. 6 and in previous paragraphs, the depth map can be any one of a number of different depth maps. In block 1108, a depth value is determined in the depth map for this specific object. Any one of a number of different methodologies can be used to determine the depth value of the specific object including brightness information or sharpness information described in the logic 1000 of FIG. 10.

In block 1110, the depth value of the specific object is adjusted over a period of time as the size of the object changes. Essentially, if one assumes that a specific object has a set size, the size of the object can only change if there is translational motion along the z-axis and/or rotation along the z-axis. When this occurs, the size of the object will change and the depth value of the object should be adjusted. If the object is increased in size, the object should receive a lower depth value and be visualized by the viewer as being closer. However, if the object is decreasing in size, the object should receive a high depth value, and be perceived by the viewer as being farther away than previously was perceived by the viewer. Last, in block 1112, a three dimensional image is generated comprising the specific object located according to the depth map. The logic 1100 then returns to block 1102.

The methods, devices, and logic described above can be implemented in many different ways in many different combinations of hardware, software or both hardware and software. For example, all or parts of the system can include circuitry in a controller, a microprocessor, or an application specific integrated circuit (ASIC), or can be implemented with discrete logic or components, or a combination of other types of analog or digital circuitry, combined on a single integrated circuit or distributed among multiple integrated circuits. All or part of the logic described above can be implemented as instructions for execution by a processor, controller, or other processing device and can be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, can include a storage medium and computer readable instructions stored on the medium, which when executed in an endpoint, computer system, or other device, cause the device to perform operations according to any of the description above.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

What is claimed is:

1. A system for converting two dimensional video to three dimensional video, the system comprising:
a processor having an input for receiving a two dimensional video data and an output for outputting three dimensional image data to a display; and
the processor being configured to receive two dimensional video data comprising two dimensional images that are displayed in a sequential order over a period of time, segment a specific object in the two dimensional images based on variations in brightness in the two dimensional images to identify and locate the specific object in the two dimensional images, generate a depth map comprising depth values indicating object depth of the specific object in a two dimensional image among the two dimensional images, determine a depth value in the depth map for the specific object, adjust the depth value of the specific object over the period of time as a size of the specific object changes in each of the two dimensional images, and generate three dimensional video data comprising the specific object located according to the depth map, wherein the depth map comprises a combination of a row accumulated depth map and a column accumulated depth map.

2. The system of claim 1, wherein the processor is configured to generate a right view output picture and a left view output picture based on the three dimensional video.

3. The system of claim 1, wherein the processor is configured to generate the row accumulated depth map comprising depth values.

4. The system of claim 3, wherein the depth values of the row accumulated depth map are arranged to place the smallest of the depth values in middle rows of the depth map.

5. The system of claim 3, wherein the depth values of the row accumulated depth map are arranged to place the smallest of the depth values in top or bottom rows of the depth map.

6. The system of claim 3, wherein the processor is configured to generate the column accumulated depth map comprising depth values, combine the depth values in the row accumulated depth map and the column accumulated depth map to generate the depth map, and wherein the smallest values of the depth map are located in the middle rows and middle columns of the depth map.

7. The system of claim 6, wherein the processor is further configured to: generate the depth map by utilizing two generated baseline depth surfaces that are row-accumulated and column-accumulated, wherein each baseline depth surface being generated using the difference of the largest edge values across two rows;
invert the sign of accumulation of the difference of largest edge values across two rows; and
combine the two baseline depth surfaces by taking minimum, maximum, or average of the two surfaces at each depth pixel location.

8. The system of claim 7, wherein the processor is further configured to: set the edge values to between a preset lower and upper bound; and blend the edge values to global depth surfaces with a preset blending factor.

9. The system of claim 6, wherein the processor is further configured to replace a current depth value of a pixel of the three dimensional image with a new depth value based on a neighboring pixels characteristics.

10. A method for converting two dimensional video to three dimensional video, the method comprising:
receiving a two dimensional video comprising two dimensional images that are displayed in a sequential order over a period of time;
segmenting a specific object in the two dimensional images based on variations in brightness in the two dimensional images to identify and locate the specific object in the two dimensional images;
generating a depth map comprising depth values indicating object depth of the specific object in an image among the two dimensional images, wherein the depth map corresponds to the image and the depth map is a combination of a row accumulated depth map and a column accumulated depth map corresponding to the image;
determining a depth value in the depth map for the specific object, wherein determining the depth value in the depth map for the specific object is based on variations in brightness of the object;
adjusting the depth value of the specific object based on a change in a size of the specific object in each of the two dimensional images; and
generating a three dimensional video comprising the specific object located according to the depth map.

11. The method of claim 10, further comprising generating a right view output picture and a left view output picture based on the three dimensional video.

12. The method of claim 10, wherein the depth values of the row accumulated depth map are arranged to place the smallest of the depth values in top or bottom rows of the depth map.

13. The method of claim 10,
wherein the smallest values of the depth map are located in the middle rows and middle columns of the depth map.

14. The method of claim 13, wherein generating the depth map further comprising the steps of:
generating two baseline depth surfaces that are row-accumulated and column-accumulated, respectively, wherein the row-accumulated baseline depth surface is generated using a difference between the largest edge values across two rows, and the column-accumulated baseline depth surface is generated using a difference between the largest edge values across two columns;
inverting the sign of accumulation of the difference of the largest edge values across two rows and columns; and
combining the two baseline depth surfaces by taking minimum, maximum, or average of the two surfaces at each depth pixel location.

15. The method of claim 14, further comprising the steps of:
setting the edge values to between a preset lower and upper bound; and
blending the edge values with a global depth surface with a preset blending factor.

16. A system for converting two dimensional video to three dimensional video, the system comprising:
a processor configured to receive two dimensional video data and further configured to output three dimensional image data to a display;
the processor further configured to receive the two dimensional video data comprising two dimensional images that are displayed in a sequential order over a period of time, segment a specific object in the two dimensional images based on variations in brightness in the two dimensional images to identify and locate the specific object in the two dimensional images, generate a depth map comprising depth values indicating object depth of the specific object in each of the two dimensional images, determining a depth value in the depth map for the specific object, adjusting the depth value of the specific object in respective depth maps of the two dimensional images as a size of the specific object changes in each of the two dimensional images, and generate three dimensional video data comprising the specific object located according to the depth map; and
the display in communication with the processor, wherein the display displays the three dimensional video;
wherein the display comprises a plurality of pixels, the pixels being of a first type forming a right view image and or a second type forming a left view image, wherein the pixels forming the left view image are linearly polarized at a different angle than the pixels forming the right view image; and wherein the depth map for a two dimensional image comprises a combination of a column based depth map and a row based depth map generated for the two dimensional image.

17. The system of claim 16, wherein the processor is further configured to: generate the depth map by utilizing two generated baseline depth surfaces that are row-accumulated and column-accumulated, wherein each baseline depth surface being generated using the difference of the largest edge values across two rows;
   invert the sign of accumulation of the difference of largest edge values across two rows; and
   combine the two baseline depth surfaces by taking minimum, maximum, or average of the two surfaces at each depth pixel location.

18. The system of claim 17, wherein the processor is further configured to:
   set the edge values to between a preset lower and upper bound; and blend the edge values with a preset blending factor.

19. The system of claim 16, wherein the processor is further configured to blend a depth map of a current two dimensional image with a depth map of a previous two dimensional image.

20. The system of claim 16, wherein the processor is further configured to reconfigure the adjusted depth map according to a user-specified pivot point.

* * * * *